F. D. VESSEY.
WHEELBARROW.
APPLICATION FILED JULY 2, 1918.
1,298,126.
Patented Mar. 25, 1919.
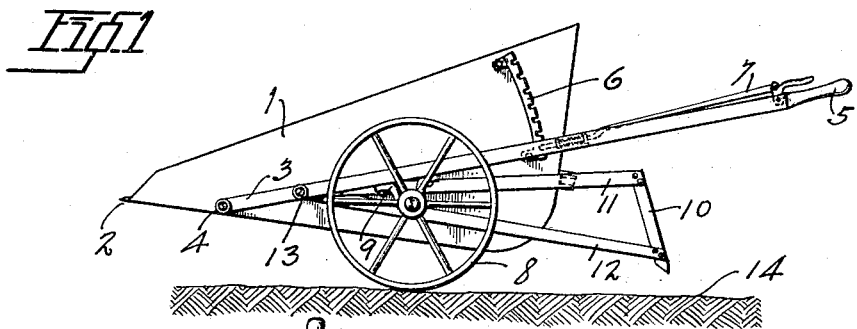
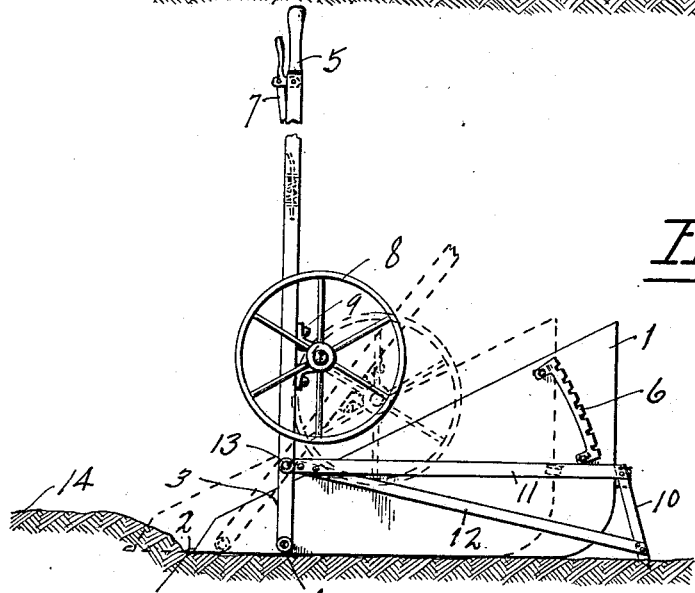
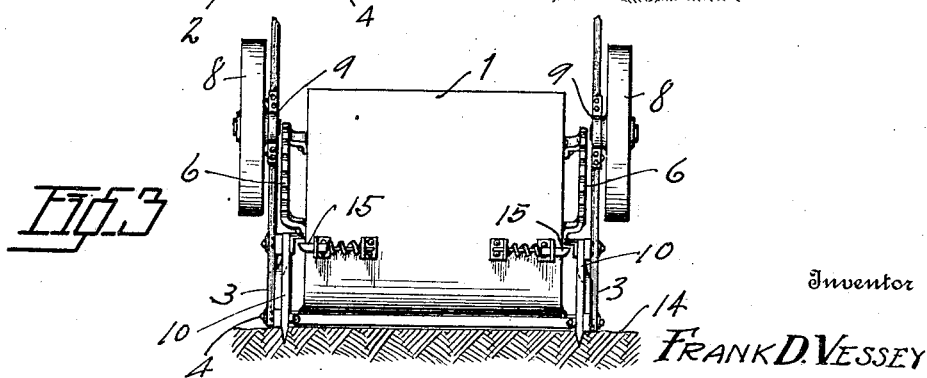
Inventor
FRANK D. VESSEY
By
Herbert E. Smith
Attorney

UNITED STATES PATENT OFFICE.

FRANK D. VESSEY, OF KELLOGG, IDAHO.

WHEELBARROW.

1,298,126.　　　　Specification of Letters Patent.　　Patented Mar. 25, 1919.

Application filed July 2, 1918. Serial No. 243,024.

*To all whom it may concern:*

Be it known that I, FRANK D. VESSEY, a citizen of the United States, residing at Kellogg, in the county of Shoshone and State of Idaho, have invented certain new and useful Improvements in Wheelbarrows, of which the following is a specification.

The present invention relates to an improved wheel barrow, which is designed and constructed with the special purpose of providing an implement of this nature that may be manipulated to load itself, and after being loaded is capable of being quickly brought to position upon its supporting wheels for transportation in the usual manner.

The primary object of the invention is the provision of a device or implement by which gravel, sand, coal, and other similar materials may be quickly loaded and transported, and with equal facility be dumped from the barrow, thus providing a labor and time saving implement that may be manipulated or handled, by one man, with efficiency and despatch.

The invention consists essentially in the construction and operation of a lever actuated device by which the barrow is scraped along the surface of the ground to load, and by which the barrow body may be elevated from the ground to position where it is supported on its pair of wheels, and in certain novel combinations and arrangements as will appear hereinafter.

In the accompanying drawings I have illustrated one complete example of the physical embodiment of the invention constructed and arranged according to the best mode so far devised for the practical application of the principles of the invention.

Figure 1 is a side elevation of a wheel barrow embodying the novel features of the present invention.

Fig. 2 is a similar view showing the barrow in loading position.

Fig. 3 is a rear end or elevation view of the implement.

The body 1 of the barrow, of metal preferably, is of suitable size, and of scraper or scoop shape, with a cutting or scraping front edge 2, and is supported in a U-shape frame 3 having opposite pivot points 4, 4, toward the front of the body of the barrow, and just above the bottom of the device.

The rear ends of the bars of the U-frame are provided with handles 5, 5, with which the implement is manipulated and handled, and the frame may be adjusted and held rigid with the body through the instrumentality of a rack bar or pair of rack bars 6, and the spring pawls or catches 7 that are located in position convenient and accessible for use by the barrow operator.

The wheels 8 for supporting the barrow are journaled in bearings 9 attached at the underside of the frame bars or U-shape frame 3, and of course the wheels are located at the proper point to secure equilibrium for the implement and a proper balance for the load contained in the barrow, the wheels being supported on short stud shafts, and it will of course be understood that the barrow and wheels are not directly connected. As thus far described, the barrow is supported at three points, viz., the pivot points 4, on the stud shafts, and at the adjustable connection of pawl and rack bar at the rear of the barrow body, and this construction provides an efficient and practical barrow of well known type.

The essence of the invention however resides in the device or mechanism by which the barrow may be manipulated to load itself and to this end a pushing and pulling operation is performed upon the barrow body to make it slide over the surface of the ground, unsupported by its wheels.

At each side of the barrow is a triangular pushing frame, each comprising a sharpened post 10, an upper bar 11 and a lower bar 12, the two latter bars being pivoted at the same point 13 on the U-shape frame of the barrow, and the pushing post, as shown is arranged oblique to the surface of the ground indicated at 14. With the barrow flat upon the ground as in Figs. 2 and 3, it will readily be seen that the lever for actuating the pushing posts 10 10 is provided by the U-frame or handles 3, and with the operator standing at the rear of the barrow, he pulls the handles toward him to the position in dotted lines, with the result that the fulcrum of the lever is the pivot 4, the power is applied at the free end of the handles and the power is transmitted through the pivots 13 and triangular pushing devices and sharpened posts with the result that the posts are forced into the ground. The continued movement of the lever now brings the fulcrum to the pivots 13 and the barrow is slid across the surface of the ground, the edge 2 scooping or scraping up the material ahead of it, and the movement of the lever frame is continued until the load is procured. The lever frame is now swung entirely backward until the wheels are brought to the ground, and then by pushing down on the handles the loaded barrow is lifted from the ground and supported on its wheels, the pawl and rack bar 6—7 coming into play to hold the loaded barrow in adjusted position. The two pushing devices may now be lifted from the ground and each supported by a spring pressed pawl 15 carried at the edges of the rear end of the barrow in position to engage under the bars 11 of the pushing frame, as seen in Fig. 3.

Claims—

1. The combination with a barrow body and the handles pivoted thereto and carrying supporting wheels, of a pushing device pivoted on the handles and operative when the barrow body is flat upon the ground, and adapted, when the handles are manipulated to push the barrow body with a scooping motion.

2. The combination with a barrow body and the handles pivoted thereto and carrying supporting wheels, of a pushing device pivoted to each handle at each side of the barrow and including a post adapted to engage in the ground, whereby, when the handles are manipulated, the devices are adapted to push the barrow body with a scooping motion.

In testimony whereof I affix my signature.

FRANK D. VESSEY.

Copies of this patent may be obtained for five cents each, by addressing the "Commissioner of Patents, Washington, D. C."